United States Patent
da Silva do Vale et al.

(10) Patent No.: US 11,187,075 B2
(45) Date of Patent: Nov. 30, 2021

(54) METHOD FOR DETECTING FLOODING IN FLEXIBLE TUBULAR PIPES UNDER HIGH PRESSURE CONDITIONS

(71) Applicant: Oceaneering International, Inc., Houston, TX (US)

(72) Inventors: Vilmar da Silva do Vale, Taubaté (BR); Rohit Bali, Nawanshahr (IN); Samik Das, Cypress, TX (US); Sheethal Sasidharan, Kerala State (IN); Vikrant Verma, Haryana (IN)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/882,882

(22) Filed: May 26, 2020

(65) Prior Publication Data
US 2021/0062641 A1 Mar. 4, 2021

Related U.S. Application Data

(60) Provisional application No. 62/892,993, filed on Aug. 28, 2019.

(51) Int. Cl.
| | |
|---|---|
| *E21B 47/107* | (2012.01) |
| *G01N 29/02* | (2006.01) |
| *G01N 29/24* | (2006.01) |
| *B63C 11/48* | (2006.01) |
| *B63G 8/00* | (2006.01) |

(Continued)

(52) U.S. Cl.
CPC ............ *E21B 47/107* (2020.05); *B63C 11/48* (2013.01); *B63G 8/001* (2013.01); *E21B 47/001* (2020.05); *E21B 47/007* (2020.05); *E21B 47/13* (2020.05); *G01N 29/02* (2013.01); *G01N 29/24* (2013.01); *B63G 2008/004* (2013.01); *B63G 2008/005* (2013.01); *E21B 17/01* (2013.01); *G01M 3/24* (2013.01); *G01N 29/2437* (2013.01); *G01N 2291/022* (2013.01); *G01N 2291/101* (2013.01)

(58) Field of Classification Search
CPC ...... E21B 47/10; E21B 47/107; E21B 47/007; E21B 47/001; E21B 47/13; G01N 29/02; G01N 29/24
See application file for complete search history.

(56) References Cited

U.S. PATENT DOCUMENTS

| | | | | |
|---|---|---|---|---|
| 3,992,923 A | * | 11/1976 | Roberts | F17D 5/06 73/40.5 A |
| 3,992,924 A | * | 11/1976 | Ells | F17D 5/06 73/40.5 A |

(Continued)

FOREIGN PATENT DOCUMENTS

CN 210197015 U * 3/2020

*Primary Examiner* — Frederick L Lagman

(57) ABSTRACT

A system for inspecting flexible pipelines comprises a data analyzer, a data collector and an ultrasonic transducer. Further, the ultrasonic transducer is adapted to propagate shear wave into the annulus of the flexible pipeline. The data collector further comprises a data store and a communicator. Further, the system is capable of differentiating flooding and non-flooding condition of the annulus of the flexible pipeline which is subjected to high pressure. Using the system, an indicator of a flooded or non-flooded condition within the flexible pipeline may be calculated using transmitted and detected reflective waves or the lack of detected reflective waves.

20 Claims, 5 Drawing Sheets

(51) Int. Cl.
*E21B 47/001* (2012.01)
*E21B 47/007* (2012.01)
*E21B 47/13* (2012.01)
*G01M 3/24* (2006.01)
*E21B 17/01* (2006.01)

(56) References Cited

U.S. PATENT DOCUMENTS

| | | | | |
|---|---|---|---|---|
| 4,218,923 | A * | 8/1980 | Triplett | E21B 47/00 73/623 |
| 5,047,990 | A * | 9/1991 | Gatos | G01S 7/52004 367/6 |
| 6,442,999 | B1 * | 9/2002 | Baumoel | G01F 1/66 73/40.5 A |
| 9,170,240 | B2 * | 10/2015 | Lin | G01N 15/06 |
| 2004/0177681 | A1 * | 9/2004 | Harthorn | G01B 17/02 73/152.57 |
| 2012/0107051 | A1 * | 5/2012 | Sweeney | B08B 9/055 405/184.1 |
| 2015/0338378 | A1 * | 11/2015 | Lu | E21B 47/14 73/632 |
| 2021/0063353 | A1 * | 3/2021 | da Silva do Vale | B63G 8/001 |

* cited by examiner

METHOD FOR DETECTING FLOODING IN FLEXIBLE TUBULAR PIPES UNDER HIGH PRESSURE CONDITIONS

RELATION TO OTHER APPLICATIONS

This application claims priority through India Provisional Application 201911020831 filed on May 26, 2019 and through U.S. Provisional Application 62/892,993 filed 28 Aug. 2019.

BACKGROUND

Flexible pipelines are generally used in oil and gas industry for transferring materials from the seafloor to the drilling and production facilities and from the facilities to the seafloor as well. In oil and gas terminology the flexible pipelines are one of but not limited to flexible risers, flexible jumpers or flexible flowlines. The flexible pipeline is termed flexible due to ease of bending of the pipeline. Further, the flexible pipelines are comprised of multiple layers of materials such as polymers and metals or composites.

In general, the main characteristic of a flexible pipeline is its low relative bending to axial stiffness. This characteristic is achieved through the use of a number of layers of different material in the pipeline wall fabrication. These layers are able to slip past each other when under the influence of external and internal loads, and hence this characteristic gives a flexible pipeline its property of a low bending stiffness. The flexible pipeline composite structure comprises of steel armor layers with high stiffness to provide strength, and polymer sealing layers with low stiffness to provide fluid integrity.

The layers of flexible pipeline vary as per the requirement and usage of the flexible pipelines, as well as application. However, a standard flexible pipeline comprises of but not limited to an inner carcass layer, pressure sheath layer, zeta layer, multiple armor layers, anti-wear layers and outer sheath layers. The integrity of the flexible pipeline is very critical for sub-sea operations. The integrity of flexible pipelines is compromised due to the flooding of the annulus region encompasses the armor layer of the pipeline. The flexible pipeline's annulus region may get flooded either due to the ingress of sea water from outside or infiltration of fluid from within the carcass/bore.

The annulus generally includes multiple armors which are usually of metallic material. Due to the flooding of the annulus, the armor wires eventually get corroded and decreases the service life, performance of the flexible pipeline and in the long run may lead to failure of the flexible pipeline. Moreover, the failure of flexible pipeline results in leakage of pipeline content to its surroundings, leading to environmental hazards and fatality of marine life. Thus, periodic inspection is required to maintain integrity of the flexible pipeline.

One of the available techniques for inspecting flexible pipeline requires the pipeline to be shut down during the inspection as a preventive measure. Further, the technique requires a lot of inspection time and is not cost-effective. As the production facility is required to be shut down for several hours, the economics of the project are affected.

Another technique for inspecting flexible pipeline comprises an ultrasonic transducer which uses guided waves to inspect the condition of armor wires. One of the major limitations of this technique is that the ultrasonic transducer is required to be in contact with the armor wires for inspection. Further, in this technique access to end section of at least an armor wire is required, which might be difficult in many cases. This method requires the outer sheath to be cut while manufacturing the flexible pipeline or after commissioning exposing the armor wires in order to mount an instrumented end fitting. Thus, in service conditions this method is not practically feasible and not financially viable.

None of the existing techniques used for inspecting flexible pipelines are reliable, as they do not provide accurate inspection results when the flexible pipeline is subjected to high external pressure. In such condition, the layers of the flexible pipeline come in close contact with each other at around or over 200 meters of depth or at pressure at or more than 20 bars, depending on the material of the layers of the flexible pipeline.

BRIEF DESCRIPTION OF THE DRAWINGS

These and other features, benefits, and advantages of the present disclosure are apparent by reference to the following figures, with the same reference numbers referring to same structures across the views, wherein.

DETAILED DESCRIPTION

In general, ultrasonic bulk waves used for industrial inspections propagate through materials in two fundamental modes, namely longitudinal, or compression and transverse, or shear waves. Particle vibration is parallel to the direction of propagation in case of longitudinal waves and travel in liquids and solids. The particle vibration is perpendicular to the direction of propagation in case of shear waves. However, shear waves are incapable of propagating in liquids and gases. Thus, shear waves are capable of traveling only in solid bodies and cannot propagate into liquids and gases. This property of shear waves allows system 100 to distinguish flooded and non-flooded flexible pipelines.

Figure 1:
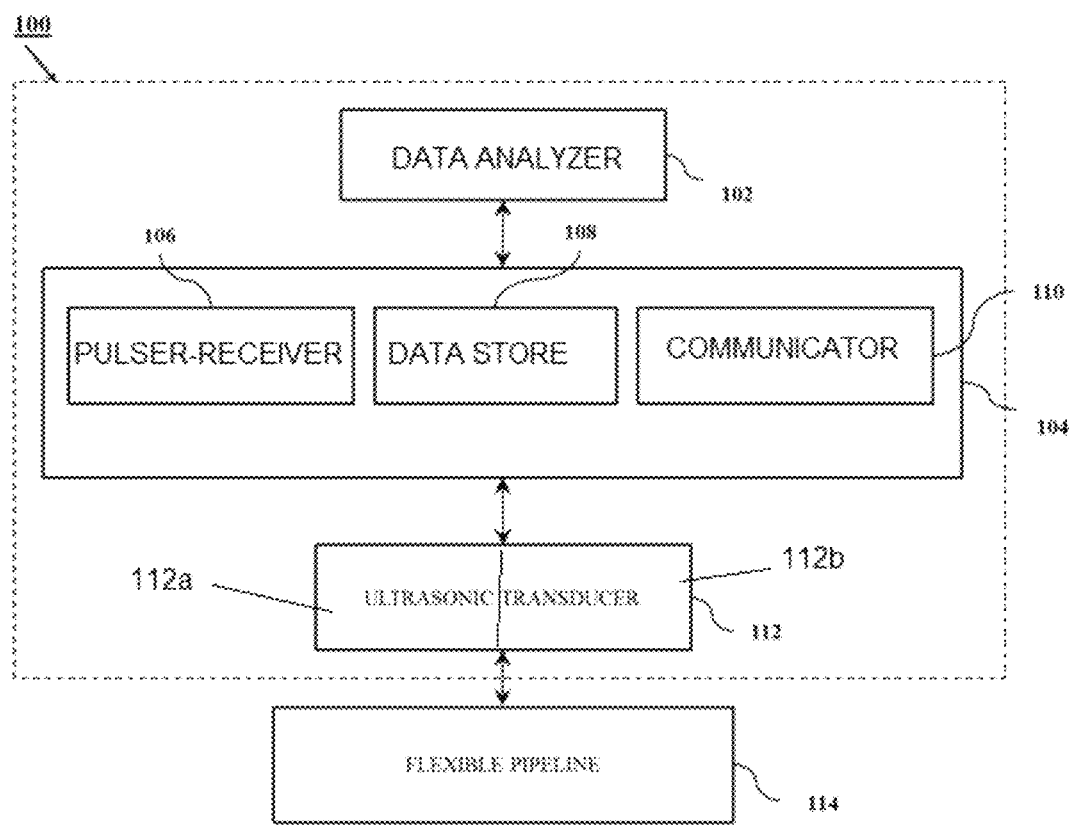
FIG. 1 illustrates a system for inspecting flexible pipeline.

Referring to FIG. 1, system 100 is useful for inspecting flexible pipeline 114. As illustrated in FIG. 1, system 100 comprises ultrasonic transducer 112 which is operatively in communication with data collector 104 which, in turn, is operatively in communication with data analyzer 102.

Data collector 104 typically includes one or more pulser-receivers 106 which are capable of generating electric energy pulses. Pulser-receiver 106 typically comprises a pulser, i.e. a pulse generator, and a receiver. In an embodiment, the pulser of pulser-receiver 106 is capable of generating voltage in the range of, but not limited to, 100 V to 400 V and capable of firing pulses at a frequency in the range of, but not limited to, 10 Hz to 1000 Hz. In an embodiment of the disclosure, receiver gain of the receiver component is broadly dynamic, typically at least, but not limited to, 100 dB, to account for wide variations for the received signal amplitude.

Pulser-receiver 106 provides electrical energy pulses to excite ultrasonic transducer 112 which is capable of transmitting and receiving ultrasound signals. Ultrasonic transducer 112 has the capability to rectify/un-rectify, control gain control, filter, smooth, reject control and/or amplify the received signal, or the like, or a combination thereof.

In an embodiment, system 100 includes a single ultrasonic transducer 112 and works in a pulse echo mode, i.e. a single ultrasonic transducer 112 functions as a transmitter and receiver. In another embodiment, system 100 includes two ultrasonic transducers 112 which work together in a pitch/catch configuration, i.e. two ultrasonic transducers 112 are used, one of which will act as a transmitter and other as receiver.

In an embodiment, ultrasonic transducer 112 acts as transmitter and receiver and essentially converts electrical energy into pressure wave sound waves which are either longitudinal or shear bulk waves. The generated ultrasonic waves are transmitted into flexible pipeline 114 and reflected signals from different layers of flexible pipeline 114 are received by ultrasonic transducer 112 to be analyzed, as discussed below.

Figure 2A:
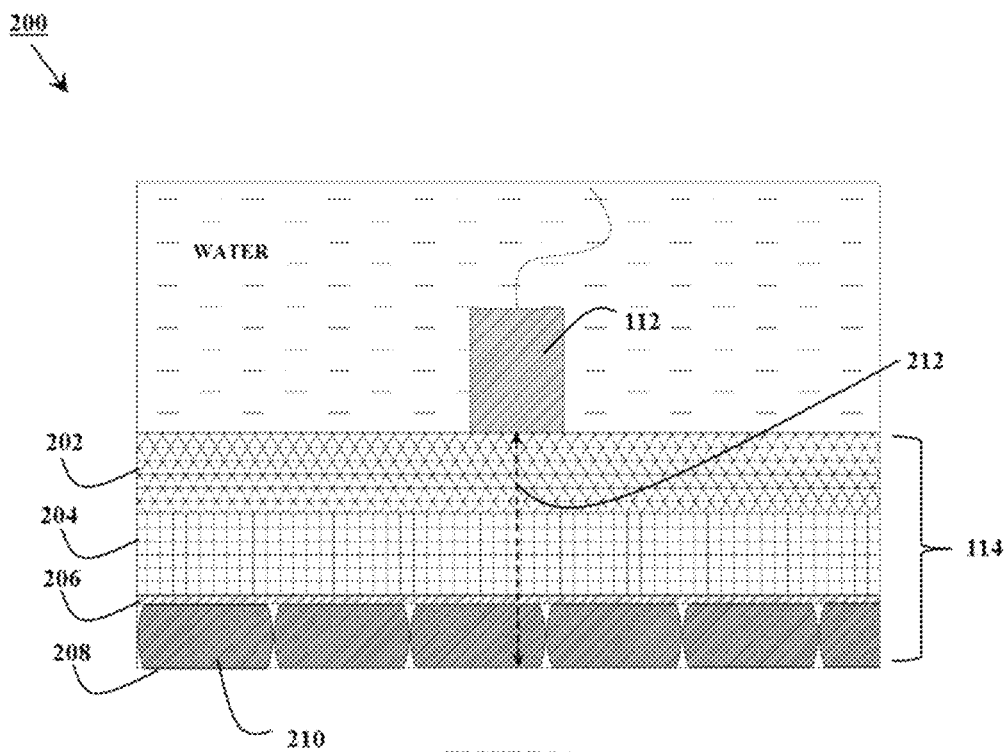
FIG. 2A illustrates an exemplary non-flooded flexible pipeline under high hydrostatic pressure, with an ultrasonic transducer.

FIG. 2A illustrates an exemplary non-flooded flexible pipeline 114 under high hydrostatic pressure, with an ultrasonic transducer 112 in accordance with embodiment 200. As illustrated in FIG. 2A, flexible pipeline 114 comprises multiple layers for providing strength to pipeline. In FIG. 2A, a portion of exemplary pipeline 114 is illustrated but standard flexible pipelines typically include multiple different layers and the layers of the flexible pipelines varies as per the user requirement.

In an embodiment, flexible pipeline 114 includes protective sheath layer 202, external sheath layer 204, high strength tape layer 206, and annulus 208, which is a region of flexible pipeline 114 that encases armor wire 210, or an annulus layer which contains one or more armor wires 210. Exemplary flexible pipeline 114 may include other layers as well.

Armor wire 210 may be rectangular or round wires for providing axial support and hoop strength to flexible pipeline 114. Further, armor wire 210 may comprise a metallic material in which case ingress of water in annulus 208 of flexible pipeline 114 increases chances of corrosion of armor wire 210. Thus, annulus 208 of flexible pipeline 114 is a critical layer for inspecting flooding presence of water.

Furthermore, when flexible pipeline 114 is subjected to high pressure, the layers of flexible pipeline 114 come in close contact with each other, e.g. at depths at or in excess of 200 m or at pressures of 20 bars or more, depending on the material of the layers of flexible pipeline 114. As a result, there is no gap between armor wire 210 and the high strength tape layer 206 if annulus 208 does not contain water. In other words, when annulus 208 does not contain water and flexible pipeline 114 is subjected to high hydrostatic pressure, armor wire 210 is in close contact with the adjacent layer high strength tape layer 206, as illustrated in FIG. 2A. In this condition, the shear wave emitted by ultrasonic transducer 112 is able to propagate into armor wire 210 and reflect back.

Figure 2B:
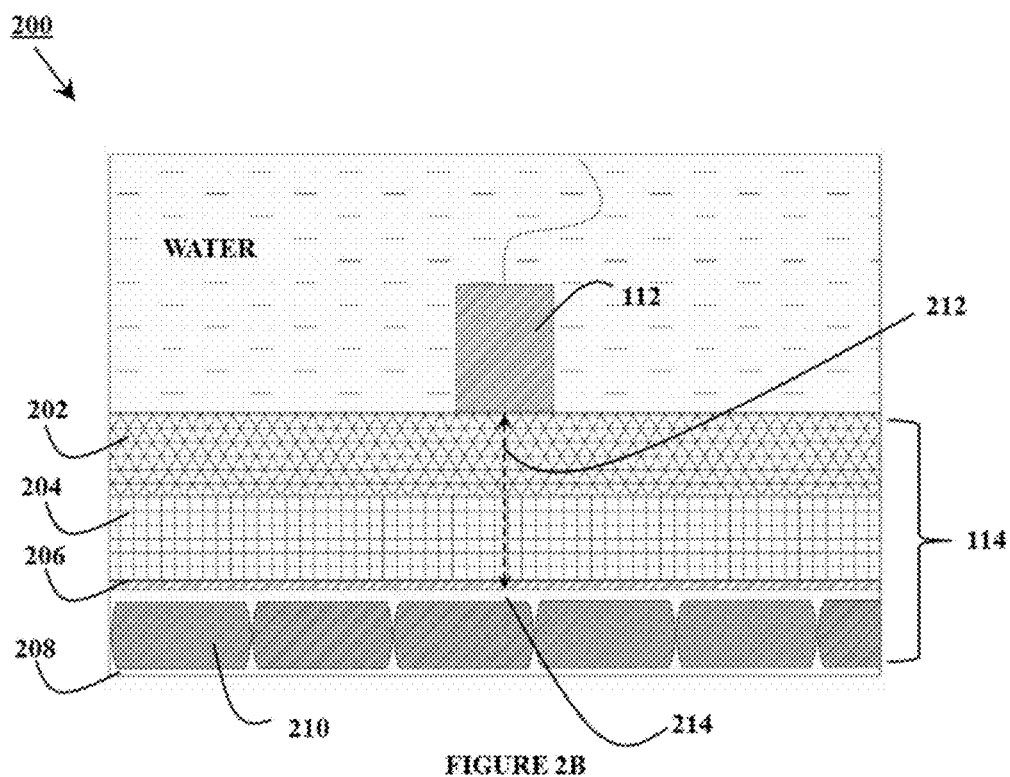
FIG. 2B illustrates an exemplary flooded flexible pipeline under high hydrostatic pressure, with an ultrasonic transducer.

FIG. 2B illustrates an exemplary flooded flexible pipeline 114 under high hydrostatic pressure, with an ultrasonic transducer 112. In embodiment 200, as illustrated in FIG. 2B, when flexible pipeline 114 is subjected to high pressure, e.g. pressure at or more than 20 bar, annulus 208 contracts, but, due to the presence of water flooded in annulus 208, water gap 214 is formed between armor wire 210 and the next layer of flexible pipeline 114. In this case, water gap 214 is formed between armor wire 210 and high strength tape layer 206. Due to the water gap 214, shear wave 212 is unable to penetrate into annulus 208. The absence of signals from the armor under high hydrostatic pressure shows that flexible pipeline 114 annulus is flooded. Thus, this method may be used for the identification of a flooded/non-flooded condition of flexible pipelines 114.

Since shear wave 212 is unable to travel in water or air, ultrasonic transducer 112 typically needs to be in contact with flexible pipeline 114, as illustrated in FIGS. 2A and 2B. In addition, typically a normal ultrasonic shear wave probe capable of working underwater is used as ultrasonic transducer 112. Ultrasonic transducer 112 comprising a shear wave probe is capable of transmitting shear wave 212 normally at an angle of around or equal to 90° into flexible pipeline 114 and receiving the reflected signal at the same angle.

Figure 3:
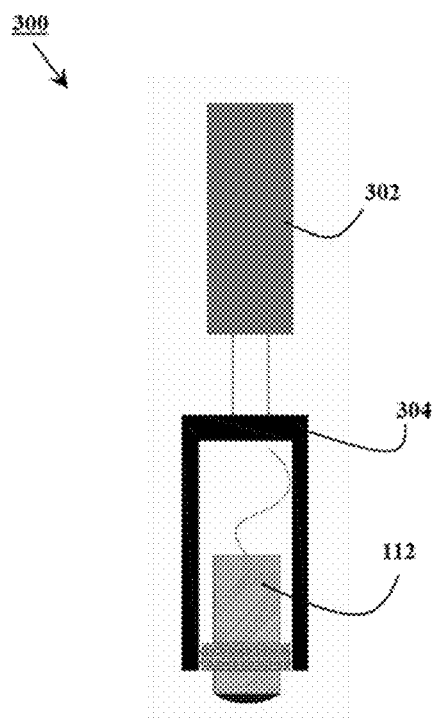
FIG. 3 illustrates an exemplary setup for using an ultrasonic transducer with dry coupling or pressure contact using a normal shear wave probe.

FIG. 3 illustrates an exemplary setup 300 for using ultrasonic transducer 112 with dry coupling or pressure contact using a normal shear wave probe. For transmitting shear wave 212 into flexible pipeline 114, ultrasonic transducer 112 typically makes tight contact, or is dry coupled, with an external surface of flexible pipeline 114. In that manner, pressure generator 302 may be mounted on ultrasonic transducer 112, as illustrated in FIG. 3, and capable of providing a firm contact of ultrasonic transducer 112 with flexible pipeline 114 while transmitting shear wave 212 into flexible pipeline 114. In an embodiment, pressure generator 302 comprises a piston and cylinder arrangement, although other similar functioning pressure generators 302 for making a firm contact of ultrasonic transducer 112 with flexible pipeline 114 may be used. As used herein, "firm" means with a pressure by which no yielding will occur between a predetermined range of pressures.

In an embodiment, probe holder 304 is in contact with pressure generator 302 where probe holder 304 is typically capable of firmly holding ultrasonic transducer 112 with a normal shear wave probe. In that manner, while pressurizing ultrasonic transducer 112 on or against flexible pipeline 114, probe holder 304 provides a rigid support for ultrasonic transducer 112. Further, probe holder 304 typically comprises a material such that probe holder 304 can withstand the force exerted by pressure generator 302 on probe holder 304 where the material does not easily corrode in sub-sea conditions. In an embodiment, the material of probe holder 304 comprises acetal, Metalon®, Inconel®, stainless steel, mild steel, or the like, or a combination thereof.

Referring again to FIG. 1, data collector 104 comprises data store 108 and data communicator 110. Data store 108 is configured to store reflected signals captured by ultrasonic transducer 112 and typically comprises volatile or non-volatile memory for storing the data. Data communicator 110 is operatively in communication with data store 108. However, the data received by ultrasonic transducer 112 are typically in analog form. Thus, data communicator 110 typically converts analog data into digital data and sends the digital data, through a hardwired cable or through wireless communication, to data analyzer 102. In one embodiment the hardwired cable comprises an umbilical cable, an electrical cable, an optical fiber, or the like, or a combination thereof. Wireless communication comprises Bluetooth, 5G, 4G, 3G, Wi-Fi, Li-FI, Wi-Max, or the like, or a combination thereof. Data store 108 and data communicator 110 are typically not in the same housing but included as separate components.

In an embodiment, data analyzer 102 is configured to analyze the captured reflected signals received from data collector 104 and comprises an analysis module (not illustrated) and a user interface (not illustrated). The analysis module comprises an embedded processing unit (not illustrated) for processing the received reflected signals, such as a processor, a microprocessor, a minicomputer, a single board computer, or the like. Further, the user interface is capable of displaying the reflected signals in one of, but not limited to, A-scan format (Amplitude vs. Time/distance), B Scan format, and/or C Scan format, as one of ordinary skill in ultrasonic arts will be familiar. In one embodiment, the user interface comprises a monitor, a cathode ray tube (CRT) display, a screen, or the like. Data analyzer 102 is capable of differentiating flooding and non-flooding of annulus 208 of flexible pipeline 114. In an embodiment, the processing unit of data analyzer 102 is capable of controlling the functioning of data collector 104.

Figure 4:
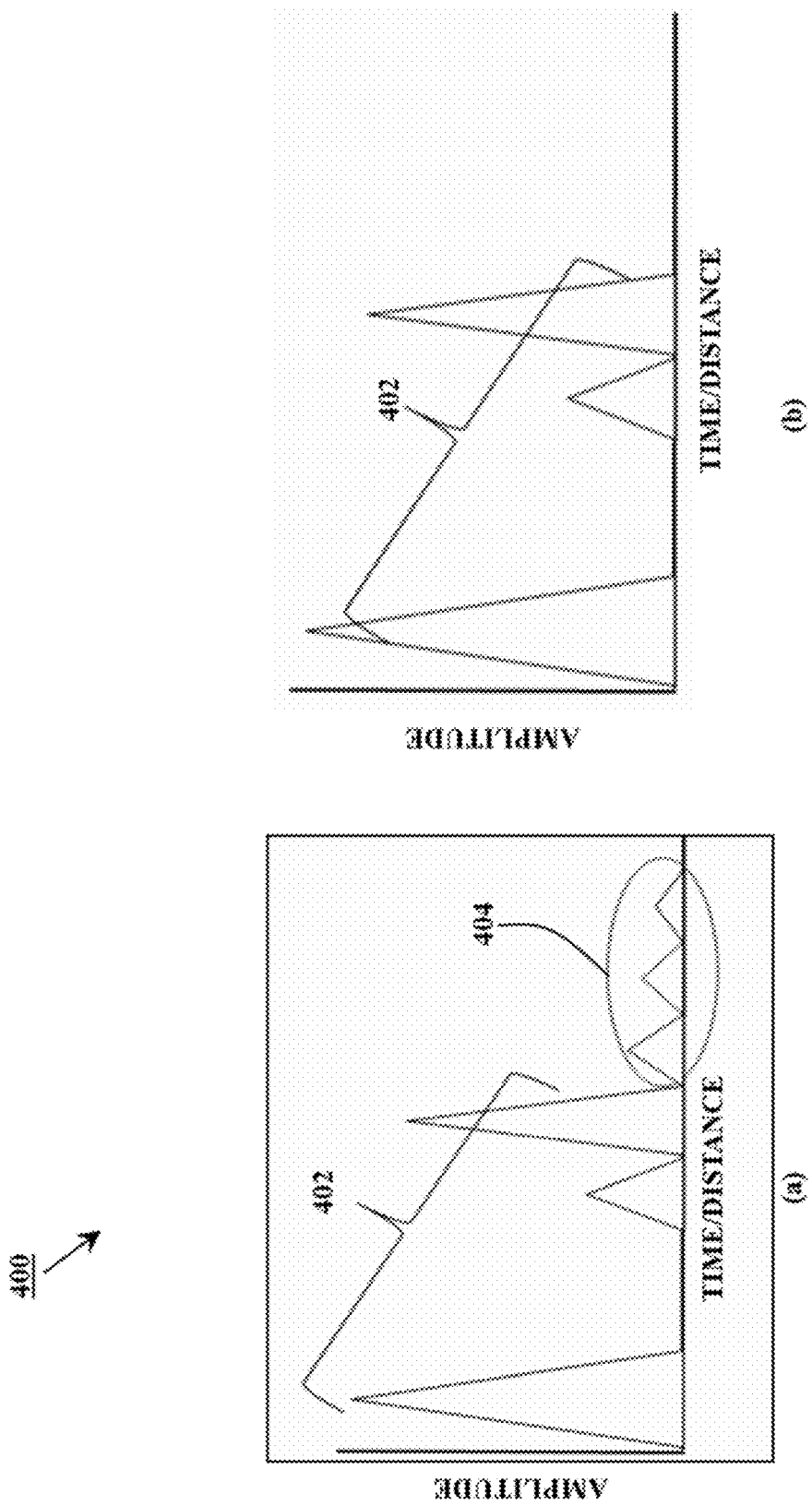
FIG. 4 illustrates amplitude vs. time/distance plots.

FIG. 4 illustrates amplitude vs. time/distance plots. In embodiment 400, as illustrated in FIG. 4, Plot A is representative of reflected signals in the form of A-scan for non-flooded flexible pipeline 114 under high pressure. Similarly, Plot B is representation of reflected signal in form A-scan for flooded flexible pipeline 114 under high pressure. In both Plots A and B, the X-axis is the time/distance axis and Y-axis is the amplitude. As illustrated in FIG. 4, initial signals 402 correspond to the outer layers before annulus 208 of flexible pipeline 114. Thus, in both the plots these initial signals 402 are present. However, signals 404 after initial signals 402 correspond to the reflected signals from armor wire 210 of flexible pipeline 114. Since, for Plot A flexible pipeline 114 is non-flooded, the armor reflections are observed. However, for flooded pipeline 114 in Plot B no armor reflections are observed. This distinguishes the flooded and non-flooded flexible pipeline 114.

In the operation of exemplary embodiments, detecting flooding in flexible tubular pipes, e.g. flexible pipeline 114, under high pressure conditions may be performed by bringing ultrasonic transducer 112 in a normal shear wave probe mode proximate to flexible pipeline 114. Ultrasonic transducer 112, with a normal shear wave probe, along with system 100 may be mounted on an automated vehicle (not illustrated) such as, but not limited to, an autonomous underwater vehicle (AUV), a remotely operated vehicle (ROV), a hybrid vehicle, a drone, a robot, or a similar subsea operable vehicle. The automated vehicle has the capability to maneuver ultrasonic transducer 112 about flexible pipeline 114.

In one embodiment, data collector 104 is mounted on the automated vehicle along with ultrasonic transducer 112 to operate underwater. Data analyzer 102 is typically disposed on a topside floating vessel (not shown in the figures) and communication between data analyzer 102 and data collector 104 is performed through hardwired communication or wireless communication.

In another embodiment, system 100 is carried manually by a diver. In this embodiment, data analyzer 102 and data collector 104 are typically in the same housing and carried manually underwater along with ultrasonic transducer 112.

In either embodiment, ultrasonic transducer 112 is firmly contacted with an external layer of flexible pipeline 114 by the diver or the automated vehicle. Further, pressure generator 302 is typically used to provide a firm and dry coupling of ultrasonic transducer 112 with the outer layer of flexible pipeline 114 to aid in squeezing out any water from between ultrasonic transducer 112 and flexible pipeline 114 external surface. After making a firm contact, ultrasonic transducer 112 is activated, controlled either through the automated vehicle or manually by the diver.

Pulser-receiver 106 activates ultrasonic transducer 112 which, in turn, produces shear waves, e.g. via its normal shear wave probe which transmits shear wave 212 into flexible pipeline 114. The shear wave propagates through the several layers of flexible pipeline 114 before reaching annulus 208. The signals reflected from each layer interface are received, recorded, and processed by system 100, e.g. the reflected signals are received, amplified, and processed by pulser-receiver 106. The collected data, which describe or are otherwise reflective of the recorded detected reflection signals, are recorded in data store 108, typically in analog form which is subsequently converted to digital data such as by data communicator 110, and transmitted to data analyzer 102 using hardwire cables or wireless communication.

The data are analyzed and processed at data analyzer 102. Data analyzer 102 provides the data in but not limited to A-scan format, B-scan format, and/or C-scan format that allows a user or subject matter expert (SME) to distinguish between flooded and un-flooded flexible pipeline 114.

Figure 5A:
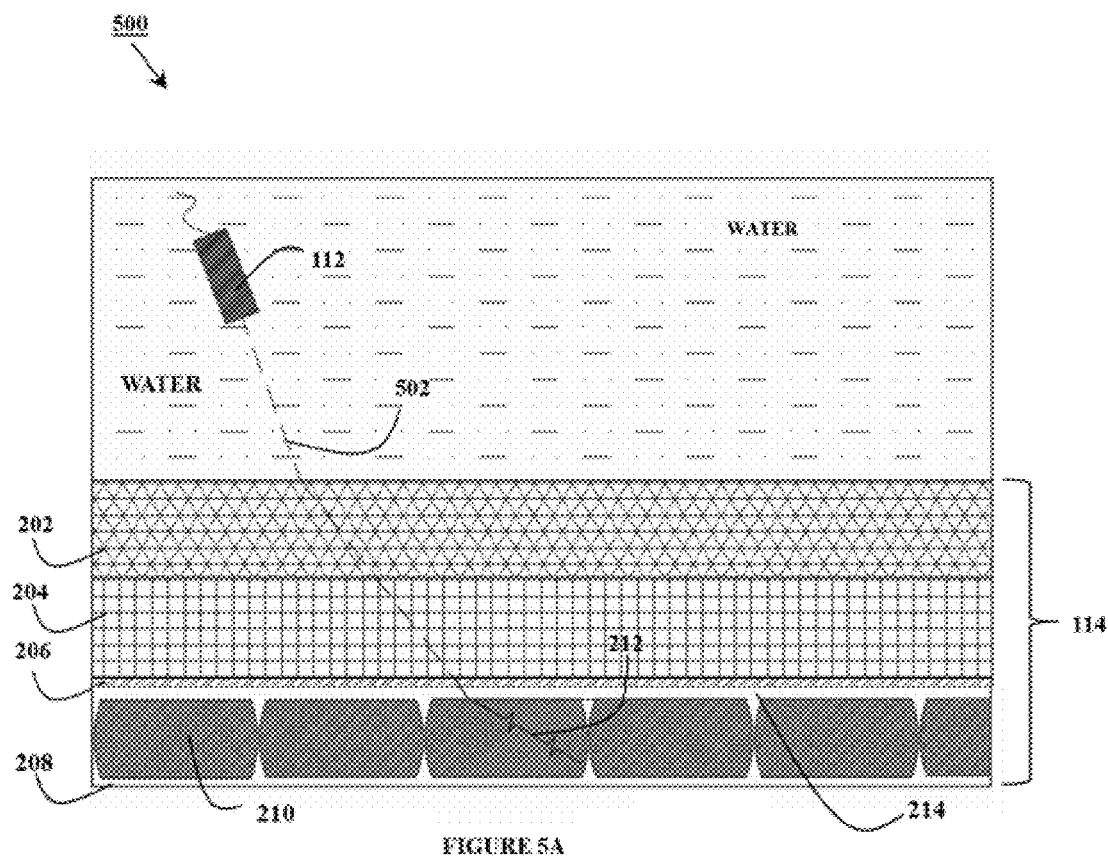
FIG. 5A illustrates a flooded flexible pipeline subjected to high pressure and the longitudinal wave generating ultrasonic transducer.
Figure 5B:
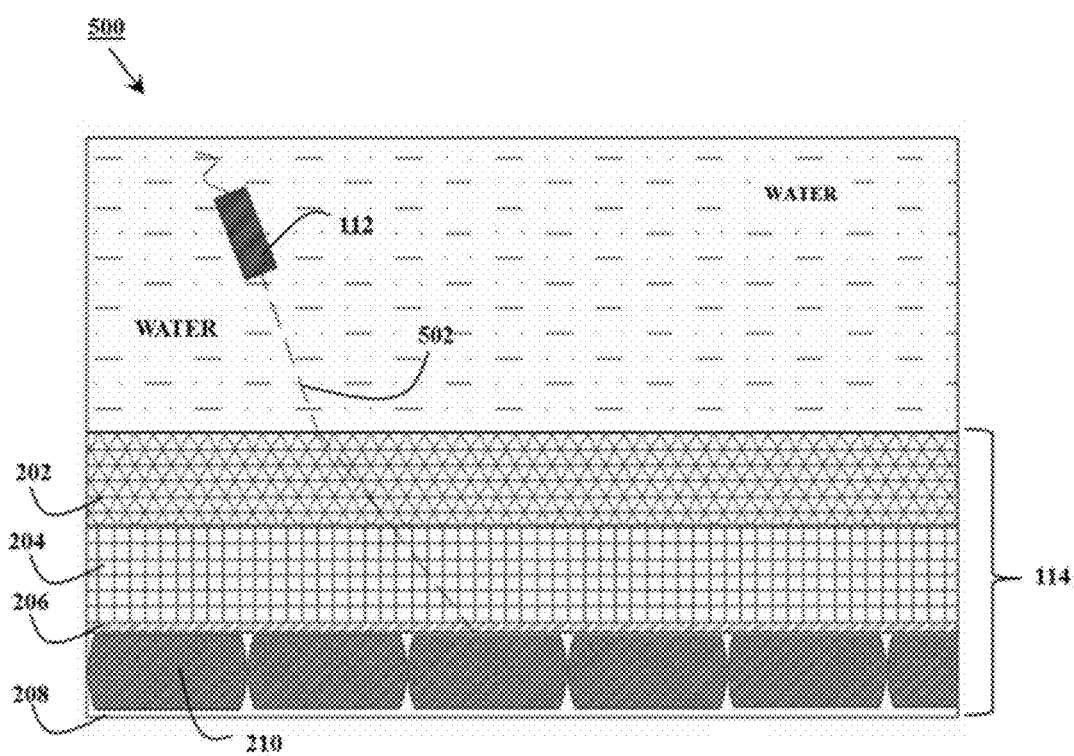
FIG. 5B illustrates flooded flexible pipeline subjected to high pressure and the longitudinal wave generating ultrasonic transducer.

In an embodiment, referring to FIGS. 5A and 5B, ultrasonic transducer 112 is a capable of generating normal incidence longitudinal wave and generated a longitudinal wave using a normal incidence longitudinal wave probe. The normal incidence longitudinal wave is generated using one of, but not limited to, a single piezoelectric element non-focused probe, a single piezoelectric element focused probe, or a multiple piezoelectric elements phased-array probe. Longitudinal waves are converted into shear waves mode converted shear waves as they enter armor wire 210 of flexible pipeline 114. In that manner, the longitudinal wave emitted by ultrasonic transducer 112 is targeted at a specific angle onto flexible pipeline 114 to convert the longitudinal wave into a shear wave by mode conversion as it enters armor wire 210 layer of flexible pipeline 114. The angle of the longitudinal wave may be changed either by changing the orientation of ultrasonic transducer 112 or by using a multiple piezoelectric elements phased-array probe or the like. The angle of the longitudinal wave may be controlled electronically by adjusting the time delays of multiple piezoelectric elements within ultrasonic transducer 112 phased-array probe. The time delay to each piezoelectric element may be adjusted so that the angle of the longitudinal wave generated is as per user requirement.

The angle of incidence of the longitudinal wave may be in the range of, but not limited to, 13° to 30° with respect to the outer surface of flexible pipeline 114. However, the exact angle of incidence of the longitudinal wave depends upon the material properties of the layers of flexible pipeline 114 which are present between annulus 208 and ultrasonic transducer 112. The exact angle for converting the longitudinal waves into shear waves before annulus 208 of flexible pipeline 114 is typically calculated using Snell's law at each interface. Snell's law states that the ratio of the sines of the angles of incidence and refraction is equivalent to the reciprocal of the ratio of respective velocities of sound in the layers concerned. The formula of Snell's law is:

$$\frac{\sin \theta_1}{\sin \theta_2} = \frac{V_1}{V_2};$$

where, $\theta_1$ is the angle of incidence; $\theta_2$ is the angle of refraction; $V_1$ is the velocity of a particular of sound longitudinal or shear in a $1^{st}$ layer; and $V_2$ is the velocity of a particular mode of sound longitudinal or shear in a $2^{nd}$ layer.

FIG. 5A illustrates flooded flexible pipeline 114 subjected to high pressure and ultrasonic transducer 112 generated longitudinal wave 502, in accordance with embodiment 500. As illustrated in FIG. 5A, ultrasonic transducer 112 is capable of generating longitudinal wave 502 at a specific angle, e.g. 13° to 30° with respect to the outer surface of flexible pipeline 114, calculated as per the properties of the layers and by using Snell's law. Longitudinal wave 502 emitted by ultrasonic transducer 112 is directed onto flexible pipeline 114 and, due to the specific angle of inclination of longitudinal wave 502, longitudinal wave 502 enters into flexible pipeline 114 and refracts at every layer of flexible pipeline 114. After multiple refractions at each layer, longitudinal wave 502 mode converts into shear wave 212 as it enters armor wire 210, as illustrated in FIG. 5A, which penetrates into armor wire 210 in annulus 208. A shear wave reflected from armor wire 210 is detected by system 100 and the presence of the armor reflections confirms that flexible pipeline 114 is flooded.

FIG. 5B illustrates non-flooded flexible pipeline 114 which is subjected to high pressure and ultrasonic transducer 112 generated longitudinal wave 502. Due to the anisotropic characteristics of high strength tape 206, the incident angle at an interface between high strength tape 206 and armor wire 210 is such that neither longitudinal wave 502 nor shear wave 212 propagates into armor wire 210. Thus, no reflected signal is received by ultrasonic transducer 112 from within armor wire 210. Therefore, a dry (non-flooded) condition of annulus 208 layer of flexible pipeline 114 is confirmed.

Figure 6:
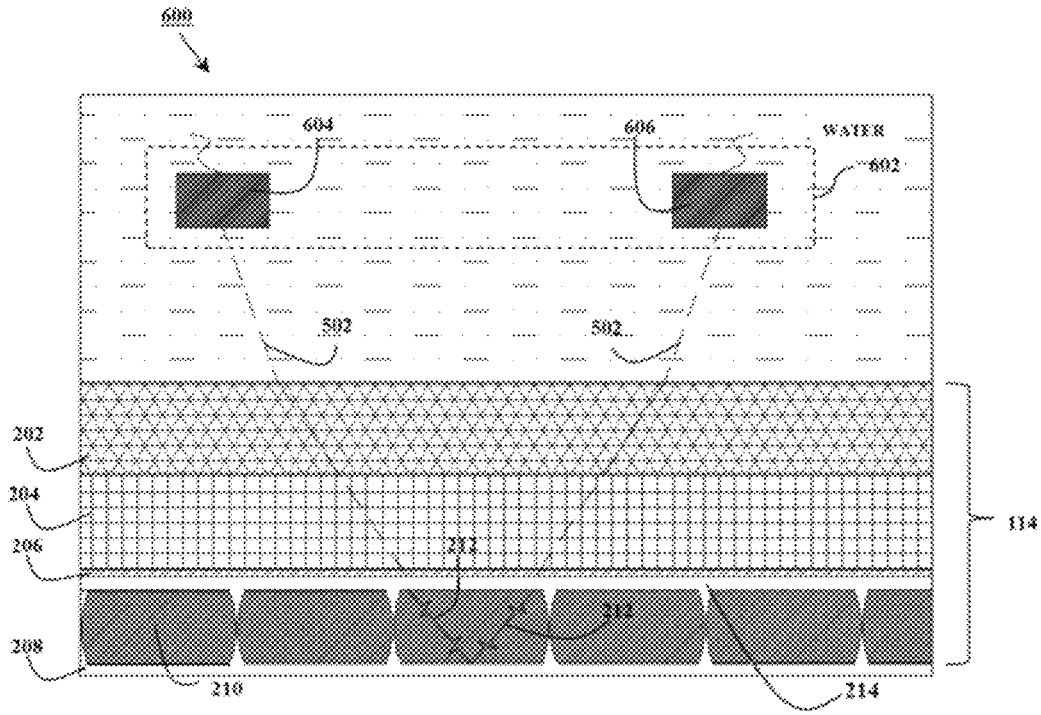
FIG. 6 illustrates the pitch-catch setup with a longitudinal wave ultrasonic transducer.

Referring to FIG. 6, in embodiment 600 two ultrasonic transducers 112 are used in a pitch and catch configuration, one acting as a transmitter and the other acting as a receiver. As illustrated in FIG. 6, transmitting ultrasonic transducer 604 and receiving ultrasonic transducer 606 are separate components and are placed at a predetermined distance from each other. Typically, the distance between transmitting ultrasonic transducer 604 and receiving ultrasonic transducer 606 depends upon the angle of incidence of the longitudinal wave transmitted by transmitting ultrasonic transducer 604 and angle of reflection of the wave reflected from annulus 208, which, in turn, depends on the material properties of the layers of flexible pipeline 114 through which the ultrasound passes. Transmitting ultrasonic transducer 604 generates a longitudinal wave using one or more single piezoelectric element non-focused probes, one or more single piezoelectric element focused probes, one or more multiple piezoelectric elements phased-array probes, or the like.

Further, for ultrasonic transducer 112, generating longitudinal wave 502 does not typically require contact between ultrasonic transducer 112 and flexible pipeline 114. However, a specific angle of incidence is required for generating shear wave 212. As described above, longitudinal wave 502 converts into shear wave 212 as it enters armor wire 210. Thus, if annulus 208 is flooded shear wave 212 penetrates armor wire 210. However, if annulus 208 is dry un-flooded shear wave 212 does not enter armor wire 210 and no reflected signal from armor wire 210 is received by ultrasonic transducer 112 to be further sent to data collector 104 (FIG. 1).

The collected data are typically recorded in data store 108 in analog form and the analog data converted to digital data, such as by data communicator 110, and transmitted to data analyzer 102 using one or more hardwire cables or wireless communication. The data are analyzed and processed at data analyzer 102. Data analyzer 102 may provide the data such that a user or subject matter expert can distinguish between flooded and non-flooded flexible pipeline 114, e.g. in A-scan format, B-scan format, C-scan format, or the like.

Figure 7:
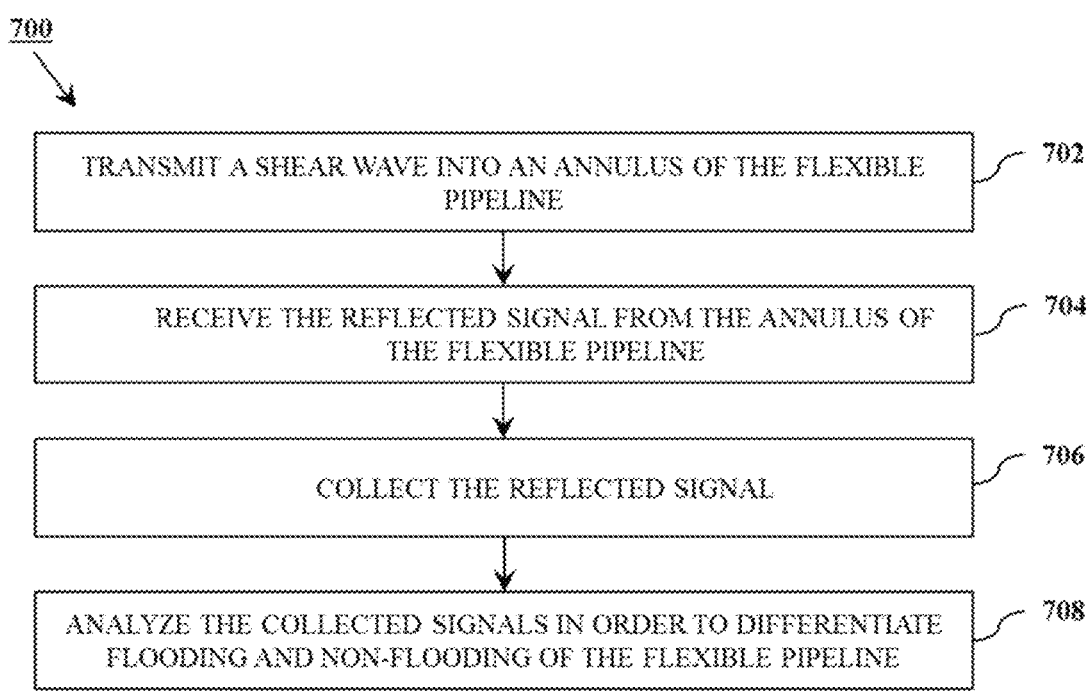
FIG. 7 illustrates a method of inspection of flexible pipeline.

FIG. 7 illustrates method 700 of inspection of flexible pipeline 114 using system 100 as described above. At step 702, shear wave 212 is transmitted into annulus 208 of flexible pipeline 114. At step 704, the reflected wave signals from annulus 208 of flexible pipeline 114 are received by ultrasonic transducer 112. At step 706, the reflected wave signals are collected and stored in data store 108 of data collector 104. At step 708, the analysis module in data analyzer 102 analyzes the collected wave signals in order to differentiate flooding and non-flooding of annulus 208 of flexible pipeline 114.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A method for detecting flooding in flexible tubular pipes under high pressure conditions using a system for detecting flooding in flexible tubular pipes under high pressure conditions comprising a pressure generator, a probe holder in communication with the pressure generator, an ultrasonic transducer disposed at least partially within the probe holder and adapted to utilize a phased array mode, a data collector operatively in communication with the ultrasonic transducer and comprising a data store, and a data analyzer operatively in communication with the data collector and configured to analyze the captured reflected signals received from the data collector, the method comprising:
    a) bringing the ultrasonic transducer to a predetermined distance proximate a flexible pipeline that comprises multiple layers;
    b) bringing the ultrasonic transducer into physical contact with an external layer of the multiple layers of the flexible pipeline;
    c) using the pressure generator to exert pressure on the ultrasonic transducer sufficient to create a firm and dry coupling of the ultrasonic transducer with the external layer of the flexible pipeline and squeeze out water, if any, from between the ultrasonic transducer and the external surface of the flexible pipeline;
    d) activating the ultrasonic transducer;
    e) using the ultrasonic transducer to introduce an ultrasonic shear wave signal through the multiple layers of the flexible pipeline into an annular space defined by an interior of the flexible pipeline, at least one layer of the several layers comprising an armor layer;
    f) using the ultrasonic transducer to detect a signal reflected from a layer interface inside the annular space;
    g) using the data collector to collect and record the detected reflection signal;
    h) storing data reflective of the recorded detected reflection signal in the data store;
    i) using the data analyzer to analyze the stored data to determine if reflections from an armor layer were detected; and
    j) generating an indicator of a flooded condition using the analyzed stored data.

2. The method for detecting flooding in flexible tubular pipes under high pressure conditions of claim 1, wherein activating the ultrasonic transducer occurs after making the firm and dry coupling.

3. The method for detecting flooding in flexible tubular pipes under high pressure conditions of claim 1, wherein the flexible pipeline comprises a non-flooded flexible pipeline under hydrostatic pressure greater than 20 bar.

4. The method for detecting flooding in flexible tubular pipes under high pressure conditions of claim 1, wherein the multiple layers comprise a protective sheath layer, an external sheath layer, a high strength tape layer, and an annulus layer which comprises an armor wire.

5. The method for detecting flooding in flexible tubular pipes under high pressure conditions of claim 4, where the indicator comprises a flexible tubular pipe dry condition if reflections from the annulus layer were detected and a flexible tubular pipe flooded condition if not.

6. The method for detecting flooding in flexible tubular pipes under high pressure conditions of claim 4, wherein, if the flexible tubular pipe comprises a flooded flexible pipeline under hydrostatic pressure greater than 20 bar:
   a) when the annulus layer does not contain water and the flexible pipeline is subjected to hydrostatic pressure greater than 20 bar, the armor wire is in close contact with an adjacent layer and the shear wave emitted by the ultrasonic transducer is able to propagate into the armor wire and reflect back; and
   b) when the flexible pipeline is subjected to the hydrostatic pressure the annulus layer contracts, but, due to the presence of water in the annulus layer, a water gap is formed between the armor wire and a next layer of flexible pipeline and, due to the water gap, the shear wave is unable to penetrate into the annulus layer, the absence of signals from the armor wire under the hydrostatic pressure indicating that the annulus layer is flooded.

7. The method for detecting flooding in flexible tubular pipes under high pressure conditions of claim 1, wherein firmly contacting the ultrasonic transducer with the external layer of the flexible pipeline is accomplished using a diver or an automated vehicle.

8. The method for detecting flooding in flexible tubular pipes under high pressure conditions of claim 1, wherein two ultrasonic transducers are used, one acting as a transmitter and the other acting as a receiver in a pitch and catch configuration, the transmitter and the receiver disposed at a predetermined distance.

9. The method for detecting flooding in flexible tubular pipes under high pressure conditions of claim 8, wherein the distance between the transmitter and the receiver is a function of an angle of incidence of a longitudinal wave transmitted by the transmitter and angle of reflection of a wave reflected from the annulus layer, which in turn depends on the material properties of the layers of the flexible pipeline through which the ultrasound passes.

10. The method for detecting flooding in flexible tubular pipes under high pressure conditions of claim 1, wherein the ultrasonic transducer comprises a normal shear wave probe, the method further comprising:
   a) using the ultrasonic transducer to transmit a shear wave at an angle of around 90° into the flexible pipeline; and
   b) receiving the reflected signal at the same angle.

11. The method for detecting flooding in flexible tubular pipes under high pressure conditions of claim 1, further comprising:
   a) mounting the pressure generator on the ultrasonic transducer;
   b) using the probe holder to firmly hold the ultrasonic transducer and provide a rigid support to the ultrasonic transducer while pressurizing the ultrasonic transducer onto the flexible pipeline; and
   c) maintaining a firm contact of the ultrasonic transducer with the flexible pipeline while transmitting the shear wave into the flexible pipeline.

12. The method for detecting flooding in flexible tubular pipes under high pressure conditions of claim 1, wherein generating an indicator of a flooded condition using the reflections comprises transforming the stored data and producing a display of an amplitude versus time/distance plot on a display device.

13. The method for detecting flooding in flexible tubular pipes under high pressure conditions of claim 12, wherein:
   a) the display comprises a Plot (A) which is a representation of a reflected signal in form of an A-scan for non-flooded flexible pipeline under high pressure and a Plot (B) which is a representation of reflected signal in form of an A-scan for flooded flexible pipeline under high pressure; and
   b) in both Plots (A) and (B) an X-axis represents a time/distance axis and a Y-axis represents amplitude.

14. The method for detecting flooding in flexible tubular pipes under high pressure conditions of claim 1, wherein:
   a) the ultrasonic transducer and the system are mounted on an automated subsea vehicle; and
   b) the automated subsea vehicle maneuvers the ultrasonic transducer around the flexible pipeline.

15. The method for detecting flooding in flexible tubular pipes under high pressure conditions of claim 14, wherein the automated subsea vehicle comprises an autonomous underwater vehicle (AUV), a remotely operated vehicle (ROV), a hybrid vehicle, a drone, or a robot.

16. The method for detecting flooding in flexible tubular pipes under high pressure conditions of claim 1, wherein:
   a) the data collector is mounted on an automated subsea vehicle along with the ultrasonic transducer to operate underwater;
   b) the data analyzer is located on a topside floating vessel; and
   c) communication between the data analyzer and the data collector is performed through a hardwired or a wireless data communication pathway.

17. The method for detecting flooding in flexible tubular pipes under high pressure conditions of claim 1, wherein the collected data are recorded in the data store in analog form and the analog data are converted to digital data by the communicator and transmitted to the data analyzer.

18. The method for detecting flooding in flexible tubular pipes under high pressure conditions of claim 1, wherein the ultrasonic transducer comprises a normal incidence longitudinal wave probe, the method further comprising:
   a) using the ultrasonic transducer to generate a normal incidence longitudinal wave;
   b) converting a normal incidence longitudinal wave into a shear wave by targeting the normal incidence longitudinal wave emitted by the ultrasonic transducer at a specific angle onto the flexible pipeline to convert the longitudinal wave into the shear wave as it enters a layer comprising armor wire of flexible pipeline; and
   c) allowing the shear wave to enter the layer comprising the armor wire of the flexible pipeline.

19. The method for detecting flooding in flexible tubular pipes under high pressure conditions of claim 18, wherein the normal incidence longitudinal wave is generated using a single piezoelectric element non-focused probe, a single piezoelectric element focused probe, or a multiple piezoelectric elements phased-array probe.

20. The method for detecting flooding in flexible tubular pipes under high pressure conditions of claim 19, wherein:
a) the angle of longitudinal wave is changed either by changing the orientation of the ultrasonic transducer or by using the multiple piezoelectric elements phased-array probe; and
b) the angle of the longitudinal wave is electronically controlled by adjusting time delays of multiple piezoelectric elements within the ultrasonic transducer phased-array probe so that the angle of the longitudinal wave generated is as per user requirement.

* * * * *